United States Patent [19]

Rader

[11] Patent Number: 4,890,578
[45] Date of Patent: Jan. 2, 1990

[54] POULTRY NIPPLE DRINKER

[75] Inventor: Helmut Rader, McLean, Va.

[73] Assignee: Monoflo International, Inc., McLean, Va.

[21] Appl. No.: 100,788

[22] Filed: Sep. 25, 1987

[51] Int. Cl.⁴ .............................................. A01K 7/06
[52] U.S. Cl. .................................................... 119/72.5
[58] Field of Search ................................ 119/72.5, 75

[56] References Cited

U.S. PATENT DOCUMENTS

| | | |
|---|---|---|
| 1,916,513 | 7/1933 | Jones . |
| 2,851,007 | 9/1958 | Kagan ................................ 119/72.5 |
| 4,389,977 | 6/1983 | Borak ................................ 119/72.5 |
| 4,589,373 | 5/1986 | Hostetler et al. . |
| 4,606,301 | 8/1986 | Steudler, Jr. . |
| 4,637,345 | 1/1987 | Hostetler . |
| 4,660,509 | 4/1987 | Steudler ................................ 119/75 |

FOREIGN PATENT DOCUMENTS 7300068 6/1973 Fed. Rep. of Germany .

Primary Examiner—Robert Peshock
Attorney, Agent, or Firm—Nixon & Vanderhye

[57] ABSTRACT

A nipple drinker for poultry or the like has a body constructed of thermoplastic acetal (e.g. DELRIN ®) so as to minimize the amount of metal utilized while providing excellent longevity. The drinker includes a valve seat, valve pin, and ball all of metal, such as stainless steel. The head of the valve pin typically is essentially flat, in which case the height of the head is about 1.7 mm when the annular spacing between the circumferential periphery of the head and the valve seat is between about 0.07–0.08 mm. Each and every drinker is individually tested for the integrity of the valve seal, the integrity of an O ring seal, and to determine the amount of water it delivers. Accepted drinkers are classified according to the number of drops of water they will deliver per unit time in use based upon the testing.

11 Claims, 2 Drawing Sheets

FAST DRIP
2.5 TO 6

SLOW DRIP
1.2 TO 2.4

0 ← NO LEAKS
NO AIR THROUGH

POULTRY NIPPLE DRINKER

BACKGROUND AND SUMMARY OF THE INVENTION

Nipple drinkers for small animals, particularly for poultry, have become popular in the last few years. Such drinkers are typically used with watering systems for poultry in cages, of for floor birds. One system in which the nipples can be utilized is shown in co-pending application Ser. No. 932,865 filed Nov. 20, 1986.

Two commercial nipples which have had significant sales in the past are illustrated in U.S. Pat. Nos. 4,606,301 and 4,637,345. While such nipples are practical from many standpoints, they either have some significant limitations or are more expensive to construct than desired. For example if a rubber or like elastomeric material is utilized as the valve seat in the nipple, it has a tendency to quickly wear out causing leakage. Also, such nipples typically are made of ABS plastic, and therefore require metal linings at portions thereof in order to prevent excessive wear of or damage to the nipple bodies. In some cases it is even necessary for the metal to extend outwardly from the nipple itself surrounding the pin actuator. Utilizing this much metal (typically stainless steel) is expensive.

According to the invention, expensive, excessive metal use is avoided by forming the body of the nipple drinker of a thermoplastic acetal (such as DELRIN ®). In this way the amount of metal utilized can be minimized (restricted only to the seat, of the stationary components of the drinker) while still providing a drinker that will deliver a relatively constant amount of water over a long period of time without wearing out.

Further, in the above-mentioned nipple drinkers, typically the head of the pin co-acting with ball is concave. Under some circumstances it is desirable to make the head flat, but if it is flat there can be significant difficulties associated with precisely controlling the flow of water through the drinker. By properly dimensioning the components, however, according to the invention the head may be made flat yet the nipple drinker still accurately dispense liquid.

Because of production variations, it is often common for nipple drinkers, such as the ones discussed above, to have widely varying rates at which they deliver water to the birds, or other animals utilizing them. This is very undesirable. As procedures advance for growing chickens, it is becoming more and more desirable for the purchaser to know how much water is being delivered per unit time to make sure that the birds are getting enough water for the climate in which they are raised, while minimizing the amount of water that is wasted. According to the present invention, a procedure is provided whereby every single nipple drinker can be tested individually after assembly, and prior to use; and they can be classified depending upon the delivery of water thereby, so that the purchaser can know what type of water delivery to expect from the nipple drinker.

According to the invention there is provided a method of supplying nipple drinkers for poultry or the like comprising the steps of: (a) Producing the nipple drinkers each with a metal valve seat, metal ball, and metal valve pin, having substantially constant dimensions from nipple drinker to nipple drinker consistent with mass production techniques. (b) Testing each nipple drinker to determine the approximate number of drops of water it will deliver per unit time in use. (c) Rejecting nipple drinkers that do not deliver water between a predetermined minimum and maximum during testing. And, (d) classifying accepted nipple drinkers, those delivering water between the minimum and maximum, into at least two different groups depending upon the approximate number of drops of water per unit time they deliver during the testing thereof.

It is the primary object of the present invention to provide an improved nipple drinker, and a procedure for testing all nipple drinkers. This and other objects of the invention will become clear from an inspection of the detailed description of the invention and from the appended claims.

DETAILED DESCRIPTION OF THE DRAWINGS

Figure 1:
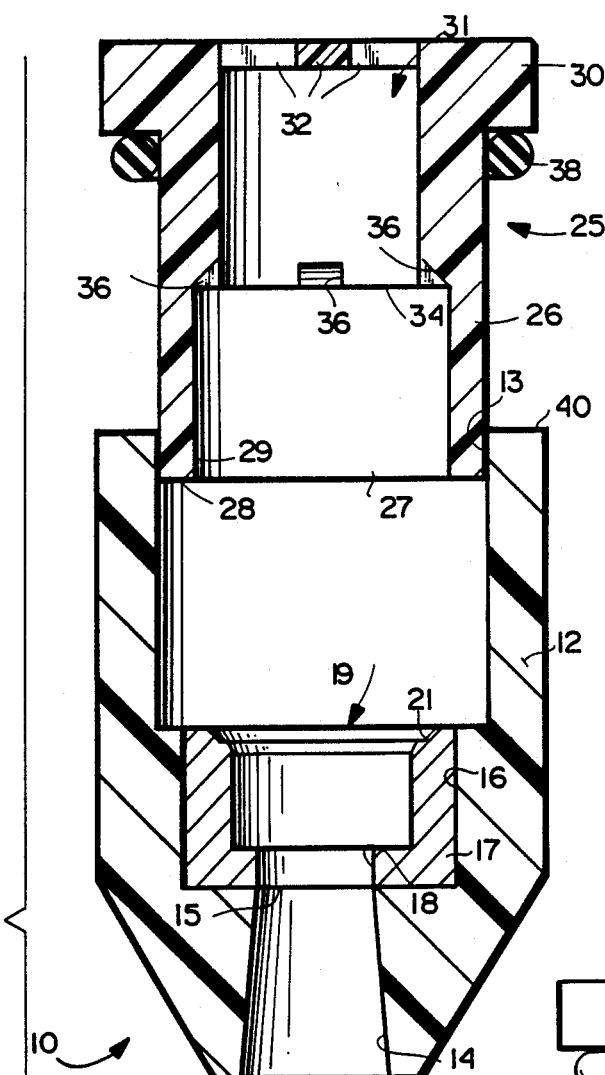
FIG. 1 is a side exploded cross-sectional view of a nipple drinker according to the invention.
Figure 2:
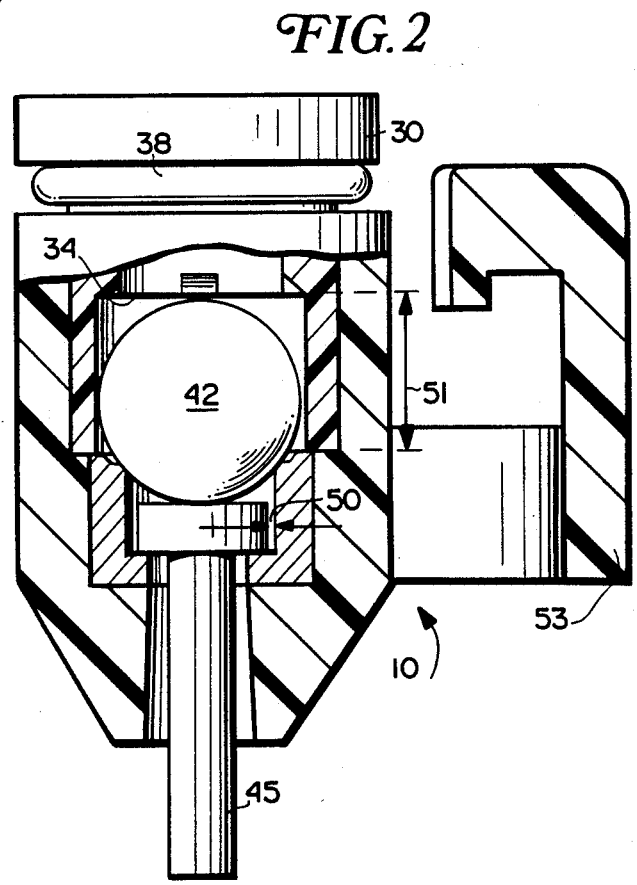
FIG. 2 is a side assembled view of the drinker of FIG. 1, partly in cross-section and partly in elevation and rotated 90° about a vertical axis with respect to FIG. 1.
Figure 3:
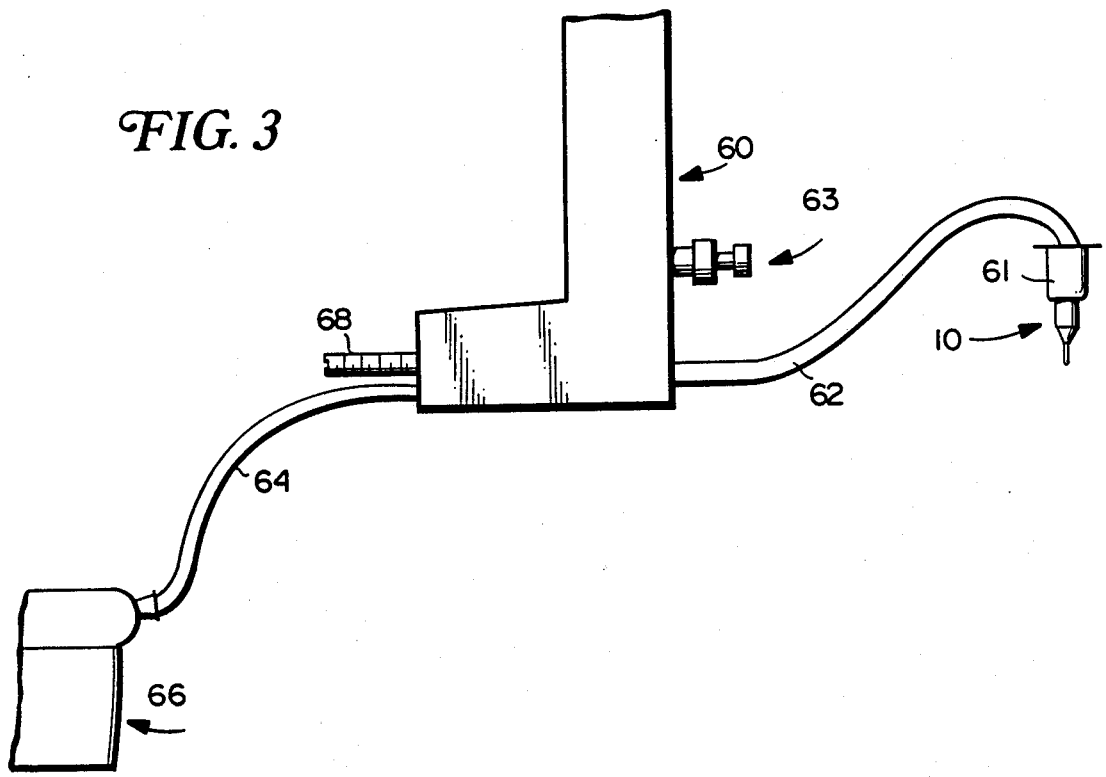
FIG. 3 is a side schematic view of an exemplary testing apparatus for testing the nipple drinkers according to the invention.

A nipple drinker according to the present invention is shown generally by reference numeral 10 in FIGS. 1 through 3. The major components thereof include a body 12, cap 25, ball 42, and actuator 44.

The body 12 is injection molded of a thermoplastic acetal or the like, such as DELRIN ®. This is a very wear resistant material and allows a minimum amount of metal to be utilized for the drinker 10 while still ensuring long life thereof. The body 12 includes a first bore 13 extending from one end thereof, a second bore 14 extending from the opposite end, and an intermediate bore 16. The bores 13, 14, 16 collectively form a first through-extending passage. The intermediate bore 16 terminates in the surface 15 generally perpendicular thereto, and seats a valve seat 17 which is of stainless steel or like metal. The bore 14 preferably is tapered a few degress, e.g. about 6°, and is not lined with metal.

The metal valve seat 17 has a first end opening 18 which is in alignment with the passage 14, and a second end opening 19 which is in communication with the passage 13, to define a second through-extending passage. The valve seat 17 at the opening 19 thereof is shaped so as to provide only a single contact line with the ball 42, a double contact line such as shown in said U.S. Pat. Nos. 4,606,301 and 4,637,345 being unnecessary.

The cap means 25 maintains the ball 42 and valve pin 44 within body 12. It comprises a body portion 26 which also is of a thermoplastic acetal or the like, and includes an opening 27 at a first end thereof with a terminating surface 28 adapted to cooperate with the engage the body 12 at the termination of bore 13. The opening 27 continues as a passageway 29 to approximately the mid-point of the body 26.

At the end of the body 26 opposite the opening 27 is the collar 30 which has a larger diameter, with a bore 31 extending from the collar 30. A solid structure 32, which may be in any desired shape (such as a cross), is disposed at the collar 30 and allows a somewhat restricted flow of liquid therethrough. Bores 29, 31 define a third through-extending passage.

A transition surface 34 is provided between the bores 31, 29 with cut outs 36 therein. An O-ring 38 preferably is provided surrounding the body 26 at the collar 30, and is compressed between the collar 30 and the top surface 40 of the body 12.

Disposed within the body 12 and passageway 29 is the ball 42, which preferably is a stainless steel ball. The diameter of the ball 42 is slightly less than the diameter of the passageway 29.

The metal valve pin 44 has a stem portion 41 thereof which extends outwardly from the body 12 (see FIG. 2), and a head 46. The head 46 engages the valve seat 17 at one face thereof, and has an upper face 47 (preferably essentially flat). The valve pin 44 is of stainless steel or like metal compatible with the metal of the seat 17.

While a flat head is desirable under some circumstances, where a flat head is provided it is often difficult to get the desired flow of water through the nipple drinker 10. This is accomplished, however, according to the invention by precisely dimensioning the height 49 of the head 46, with respect to the annular spacing 50 between the head 46 and the valve seat 17. Typically, the width of the annular spacing 50 is about 0.06 mm.–0.09 mm., with a preferred range of 0.07 mm.–0.08 mm. The height 49 of the head 46 is then about 1.65–1.75 mm., with about 1.7 mm. optimum. The spacing 51 between the valve seat and the ledge 34 is not particularly critical, but typically is larger than the radius of the ball 42.

Note that the portion of body 12 defining bore 14 below valve seat 17 is of significant extent, but contains no metal lining; i.e. the volume between the stem 45 and body 12 (see FIG. 2) is open. Yet excessive wear does not occur because of the acetal material from which body 12 is constructed.

The nipple drinker 10 also has a conventional mounting hook portion 53 which is adapted to cooperate with a tube attached to a water supply conduit, or the like, to mount the drinker 10 so that the opening 31 thereof communicates with liquid flowing in the tube, as seen in said U.S. Pat. Nos. 4,606,301 and 4,637,345.

According to the present invention, each nipple drinker 10 is tested after assembly. The test procedure utilized tests the integrity of the "O" ring 38, the integrity of ball seat 42/17 and valve seat 46/17 when the drinker is in a no-flow position, and how much water is delivered by the drinker—all in one test procedure. Utilizing this test procedure rejected nipples are easily located and bad nipples will not get out to the consumers (as occurs when only selected ones of the nipples are tested). Also, this procedure allows classification of the nipples depending upon the amount of water that they deliver, which varies from nipple to nipple because of the impossibility of making all the drinkers identical even when great care is given to the construction and machining of the parts.

Figure 4:
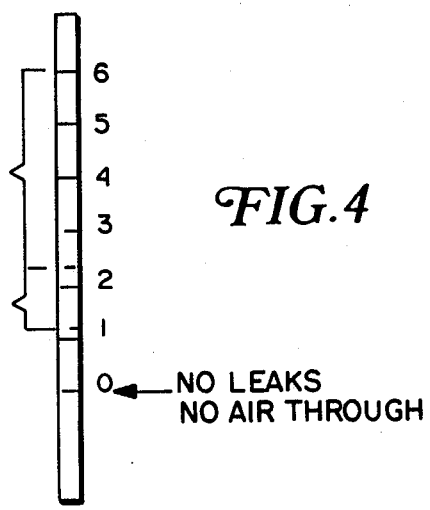
FIG. 4 is a scale from the apparatus of FIG. 3, illustrating an exemplary classification of drinkers tested.

The basic testing apparatus 60 comprises a conventional commercially available piece of Bendix test equipment, sold under the name Sheffield. It has a flexible conduit 62 leading to a fixture 61 for receipt of the nipple drinker 10; adjustment knob means 63 for calibration adjustment and for float positioning adjustment; a flexible hose 64 which supplies air, and is connected to the water trap 66 having a drain cock; and a regulator adjustment screw 68. The scale illustrated in FIG. 4 is provided on the face (containing the adjustment knob 63) of the unit 60, and the float is visible therein.

In a typical operational procedure for testing nipple drinkers 10 utilizing the apparatus of FIGS. 3 and 4, the water trap 66 is set 18 inches below the unit 60, and water is drained as necessary to protect the unit. The regulator adjustment screw 68 is adjusted to provide about 1–2 pounds of air pressure at the fixture 61. The operator holds his/her finger over the fixture 61 open end and turns the flow positioning adjustment 63 until the float is on "zero" on the scale of FIG. 4. Then the nipple drinker 10 is inserted in fixture 61 with the stem 45 extending downwardly; and then the stem 45 is pushed sideways by the operator's finger. This allows air to flow through the nipple drinker 10. If the float does not reach "6" on the scale of FIG. 4, a calibration adjustment is made using the knob means 63, and the operator holds his/her finger over the fixture 61 end again and turns the float positioning adjustment until the float is at "zero" on the scale of FIG. 4. Then the Bendix testing unit 60 is operated pursuant to its manual of operation, and the number of drops of water expected to pass through the nipple drinker 10 when actuated are determined from the scale of FIG. 4. If the float reads between 0–1.2 on the scale of FIG. 4, too little water is passing therethrough and the nipple drinker 10 cannot be used. If the scale reads 1.2–2.4, the nipple drinker 10 is projected to deliver about 12 drops of water in 15 seconds when used in a line with six inches of water head. If the scale of FIG. 4 reads between 2.5 and 6, then the nipple drinker 10 is considered to be a fast flow drinker. Between about 2.5–4 it would deliver about 25 drops of water in 15 seconds on a nipple line with 6 inches head of water, and from about 4–6 it would deliver about 40 drops in 15 seconds. If the float is higher than 6 on the scale of FIG. 4, too much water is delivered thereby and again it must be rejected.

Thus, according to the present invention all nipple drinkers are tested, and of the accepted drinkers they may either be classified as slow or fast, or minimum flow, middle flow, and maximum flow.

It will thus be seen that according to the present invention a particularly desirable nipple drinker having a number of advantageous characteristics, including long life while utilizing a minimum amount of metal, is provided, as well as a method of testing nipple drinkers that allows both accept/reject testing and classification thereof. While the invention has been herein shown and described in what is presently conceived to be the most practical and preferred embodiment it will be apparent to those or ordinary skill in the art that many modifications may be made thereof within the scope of the invention, which scope is to be accorded the broadest interpretation of the appended claims so as to encompass all equipment structures and procedures.

I claim:

1. A nipple drinker comprising:
   a body of thermoplastic acetal, and including means defining a first through extending passage extending from a first to a second end thereof in a dimension of elongation;
   a metal valve seat disposed in said body and having a second through extending passage in line with said first passage, and having first and second portions;
   a metal ball seated on said valve seat first portion;
   a metal valve pin including a stem and a head, said head and pin elongated in said first dimension and aligned with said passages; said head having a first surface engaging said ball and extending essentially perpendicular to said first dimension, and a second surface engaging said valve seat second portion, and extending essentially perpendicular to said first dimension, and an annular spacing being provided between the circumferential periphery of said head and said valve seat;

said body including a portion extending downwardly from said valve seat a significant distance, the volume between the downwardly extending portion and the valve stem being open; and a cap means of thermoplastic material cooperating with said body for maintaining said ball and said valve pin within said body, and having a third through extending passage in aligment with said first and second passages.

2. A nipple drinker as recited in claim 1 wherein said head first surface is essentially flat.

3. A nipple as recited in claim 2 wherein said head has dimensions comparable to: the height of said head, in said first dimension, being between about 1.65–1.75 mm when the annular spacing of said head from said valve seat is between about 0.06–0.09 mm.

4. A nipple drinker as recited in claim 3 wherein said annular spacing is between about 0.07–0.08 mm.

5. A nipple drinker as recited in claim 4 wherein said head height is about 1.7 mm.

6. A nipple drinker as recited in claim 1 wherein said cap means is of thermoplastic acetal.

7. A nipple drinker as recited in claim 6 wherein said thermoplastic acetal of said body and cap means is DELRIN.

8. A nipple as recited in claim 6 further comprising an O ring between said body and said cap means.

9. A nipple drinker comprising:
a body of thermoplastic material, and including means defining a first through extending passage extending from a first to a second end thereof in a dimension of elongation;
a metal valve seat disposed in said body and having a second through extending passage in line with said first passage, and having first and second portions;
a metal ball seated on said valve seat first portion;
a metal valve pin including a stem and a head, said head and pin elongated in said first dimension and aligned with said passages; said head having a first surface engaging said ball and extending essentially perpendicular to said first dimension, and a second surface engaging said valve seat second portion, and extending essentially perpendicular to said first dimension, and an annular spacing being provided between the circumferential periphery of said head and said valve seat;

said head first surface being essentially flat; and the head having dimensions comparable to: said head having a height, in said first dimension, of between about 1.65–1.75 mm when said annular spacing between about 0.06–0.08 mm, so as to deliver an appropriate amount of water for poultry; and a cap means of thermoplastic material cooperating with said body to maintain said ball and valve pin within said body.

10. A nipple drinker as recited in claim 9 wherein said annular spacing is between about 0.07–0.08 mm.

11. A nipple drinker as recited in claim 10 wherein said head height is about 1.7 mm.

* * * * *